(12) United States Patent
Choe et al.

(10) Patent No.: US 7,535,409 B1
(45) Date of Patent: May 19, 2009

(54) IMAGING RADAR METHOD AND SYSTEM

(75) Inventors: Joon Y Choe, Potomac, MD (US); Eung Gi Paek, Germantown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 81 days.

(21) Appl. No.: 11/612,153

(22) Filed: Dec. 18, 2006

(51) Int. Cl.
*G01S 13/02* (2006.01)
*G01S 13/89* (2006.01)
*H01Q 3/00* (2006.01)

(52) U.S. Cl. .................. 342/159; 342/54; 342/82; 342/179; 342/196; 342/368

(58) Field of Classification Search ......... 342/368–377, 342/52, 54, 95–97, 196, 73, 82, 159, 179, 342/195
See application file for complete search history.

(56) References Cited

U.S. PATENT DOCUMENTS

| | | | | |
|---|---|---|---|---|
| 4,835,689 | A * | 5/1989 | O'Donnell | 250/580 |
| 4,989,143 | A * | 1/1991 | O'Donnell et al. | 600/437 |
| 5,223,838 | A * | 6/1993 | Tang et al. | 342/13 |
| 5,486,833 | A * | 1/1996 | Barrett | 342/204 |
| 6,630,905 | B1 * | 10/2003 | Newberg et al. | 342/370 |
| 2006/0273951 | A1 * | 12/2006 | Adams et al. | 342/159 |
| 2008/0030404 | A1 * | 2/2008 | Irwin L. et al. | 342/372 |

OTHER PUBLICATIONS

Ultra Wideband Photonic Control of an Adaptive Phased Array Antenna Cox et al. Proc. of SPIE vol. 6243 62430V-7.*

Prada et al., "Decomposition of the time reversal operator detection and selective focusing on two scatterers," *J. Acoust. Soc. Am.* 99 2067-76 (1996).
Henry et al., "Multipath-Enabled Super-Resolution for rf and Microwave Communication using Phase-Conjugate Arrays," *Phys. Rev. Lett.* 93, 243904 (2004).
M. Fink, "Time-Reversed Acoustics," *Sci. Am.* 281(5), 91 (1999).
Lerosey et al., "Time Reversal of Electromagnetic Waves," *Phys. Rev. Lett.* 92(19), 193904 (2004).
Skolnik, "Attributes of the Ubiquitous Phased Array Radar", IEEE Phased Array Systems and Technology Symposium, Oct. 14-17, 2003.
M. Stojanovic, J. Catipovic and J. G. Proakis . "Adaptive multichannel combining and equalization for underwater acoustic communications," *J. Acoust. Soc. Am. 94* (3), 1621-1632 (1993).
J. Labat and C. Laot, "Blind adaptive multiple-input decision-feedback equalizer with a self-optimized configuration." *IEEE Trans. Comm.*, vol. 49, No. 4, 646-654 (2001).

(Continued)

*Primary Examiner*—Thomas H Tarcza
*Assistant Examiner*—Cassi Galt
(74) *Attorney, Agent, or Firm*—John J. Karasek; L. George Legg

(57) ABSTRACT

A time-reversal imaging radar system for acquiring an image of a remote target includes an antenna array having a plurality of spaced-apart antennas, and a transceiver coupled to the antenna array for alternately transmitting a radar signal via the antenna array toward the target and for receiving target-reflected radar signals. The transceiver includes means for multiple-pass time-reversing the transmitted and received radar signals whereby coherent beam focusing is realized at both the target and at the receiver to thereby enhance the resolution of the acquired target image.

13 Claims, 9 Drawing Sheets

OTHER PUBLICATIONS

M. Stojanovic, L. Freitag and M. Johnson, "Channel-estimation-based adaptive equalization of underwater acoustic signals." *IEEE Oceans'99* vol. 1, 590-595, Seattle WA (1999).

E. M. Sozer, J. G. Proakis, and F. Blackmon, "Iterative equalization and decoding techniques for shallow water acoustic channels," IEEE Oceans 2001 vol. 4, 2201-2208 (2001).

M. Stojanovic, J. Catipovic and J. G. Proakis, "Reduced-complexity spatial and temporal processing of underwater acoustic communication signals," *J. Acoust. Soc. Am*. 98 (2), 961-972 (1995).

J Edelmann et al, "An initial demonstration of underwater acoustic communication using time reversal," *IEEE J. Oceanic Eng*. 27, 602-609 (2002).

D. Rouseff et al. "Underwater acoustic communication by passive-phase conjugation: Theory and experimental results," *IEEE J. Oceanic Eng*. 26. 821-831 (2001).

Paek et al., "Antenna Calibration Method and System", U.S. Appl. No. 11/376,633, filed Mar. 14, 2006 (available as EFW).

* cited by examiner

Figure 7

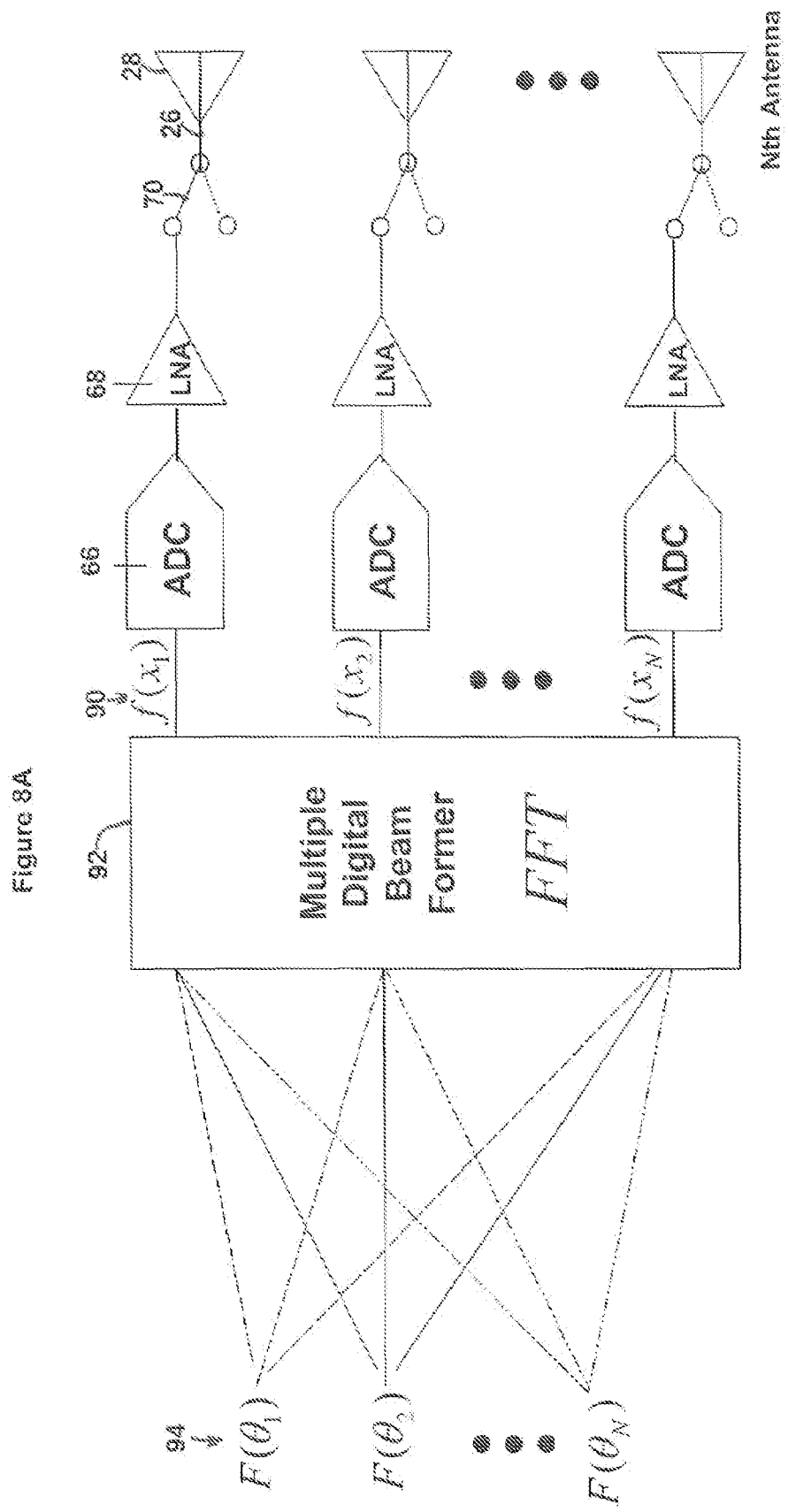

IMAGING RADAR METHOD AND SYSTEM

FIELD OF THE INVENTION

This invention relates generally to high resolution imaging radar. In particular, the invention relates to a time-reversed scanning imaging radar with an enhanced-resolution acquired target image.

BACKGROUND OF THE INVENTION

Time-reversal (sometimes referred to as phase-conjugation) has characteristics that make it highly attractive for radar applications. These include automatic tracking of moving targets and self-focusing, regardless of atmospheric turbulence without a need for any prior knowledge or iterative adaptive processing. However, the time-reversal proposed to date is limited to one-way distortion compensation. The operation of the conventional single-pass time-reversal radar is shown in FIG. 1 and is as follows:

TABLE 1

Operational principle of conventional single-pass time-reversal.

| BEAM | BEAM CHARACTERISTICS |
| --- | --- |
| a' | A pilot beam illuminates the area that includes an intended target. |
| b' | Part of the beam is reflected from the target. Its wavefront is distorted by the shape of the target. |
| b | Beam propagates through the atmosphere. Wavefront is further distorted. |
| c | Part of beam b arriving at transmitter/receiver (Tx/Rx) is time-reversed by Time-Reversal Mirror (TRM), and is reflected back toward the target. The wavefront c partially resembles b. |
| c' | After transmission through the atmosphere, the beam c' resembles b' and so is focused on the target. Coherent beam focusing on a target |

As a result, the returned beam is coherently summed and focused at the target (c'). However, one should note that the coherent beam focusing is limited to the target side only, not at the transmitter/receiver (Tx/Rx) side, as can be appreciated by the distorted wavefront (b, c). This feature of target side-only focusing of the conventional time-reversal has limited its use for imaging or radar applications, which require compensation of distortion occurred by round trip and beam focusing at both target and Tx/Rx.

In order to obtain an image using time-reversal, the DORT (Decomposition of the time reversal operator) method has been proposed by Prada et al. (Prada C, Manneville S, Spoliansky D and Fink M, "Decomposition of the time reversal operator: detection and selective focusing on two scatterers," *J. Acoust. Soc. Am.* 99 2067-76, 1996.).

The method reconstructs targets by back propagation of the first temporal eigenvectors obtained by singular value decomposition. However, it has limited application to narrowband signal with a small number of discrete target points. Also, it requires information on detailed background boundary condition in order to back propagate the wave and to reconstruct an image. Further, these operations require a significant amount of computation time.

BRIEF SUMMARY OF THE INVENTION

According to the invention, a time-reversal imaging radar system for acquiring an image of a remote target includes an antenna array having a plurality of spaced-apart antennas, and a transceiver coupled to the antenna array for alternately transmitting a radar signal via the antenna array toward the target and for receiving target-reflected radar signals. The transceiver includes means for multiple-pass time-reversing the transmitted and received radar signals whereby coherent beam focusing is realized at both the target and at the receiver to thereby enhance the resolution of the acquired target image.

Also according to the invention, a method for radar imaging includes i) transmitting a first radar signal toward the target to reflect off the target as a first reflected radar signal; ii) receiving the first reflected radar signal; iii) processing the first reflected radar signal to generate a time-reversed radar signal; iv) transmitting the time-reversed radar signal toward the target whereby coherent beam focusing with the first radar signal is realized at the target, with the time-reversed radar signal reflecting from the target as a second reflected radar signal time-reversed with the first radar signal; v) receiving the second reflected radar signal whereby coherent beam focusing with the first radar signal is realized at the receiver; and vi) repeating steps i)-v) for a desired number of steering angles to thereby acquire a high resolution radar image.

The invention overcomes limitations of conventional time-reversal using double-pass time-reversal imaging and photonic beam scanning. The radar beam is coherently focused not only on the target (as is the case with conventional phase conjugation) but also at the transmitter/receiver (Tx/Rx), satisfying the conjugate imaging requirements. The beam is then scanned along both azimuth and elevation directions using a photonic beam forming network to obtain an entire image. The time-reversal imaging is a combination of conventional radar scanning and time-reversal. It can generate a high resolution image without requiring background information or any computation other than time-reversal. To improve resolution even further, the invention further includes extended virtual aperture (EVA) that is provided by ionospheric turbulence and sea clutter in case of HF-OTHR (high frequency-over-the-horizon radar). The multipath interference is coherently summed using phase conjugation and thus increases effective aperture size.

BRIEF DESCRIPTION OF THE DRAWINGS

FIG. 7 is a schematic diagram of an embodiment of a time-reversal imaging radar system according to the invention;

FIG. 8A is a schematic diagram of a multiple digital beam former receiver according to the invention;

DETAILED DESCRIPTION OF THE INVENTION

Consider a monochromatic beam propagating through a linear lossless distorting medium in $\bar{k}$ direction $$E_1(\bar{r},t)=Re[\psi(\bar{r})\cdot e^{i(\omega t-\bar{k}\cdot\bar{r})}]=Re[A_1(\bar{r})\cdot e^{i\omega t}].$$

$A_1(\bar{r})$ reflects spatial modulation of information such as distortion and diffraction. Phase conjugation of $E_2(\bar{r},t)$ is defined as $$E_2(\bar{r},t)=Re[\psi^*(\bar{r})\cdot e^{i(\omega t+\bar{k}\cdot\bar{r})}]=Re[A_2(\bar{r})\cdot e^{i\omega t}],$$

where $A_2(\bar{r})=A_1(\bar{r})$.

To get $E_2$ from $E_1$, we take the complex conjugate of the spatial part only, leaving the factor $e^{i\omega t}$ intact. This is equivalent to leaving the spatial part alone but reversing the sign of t. That's why phase conjugation is often called time-reversal.

However, traditional phase conjugation works for only monochromatic waves and has limited applications, while time-reversal works for arbitrary waveforms.

Figure 1:
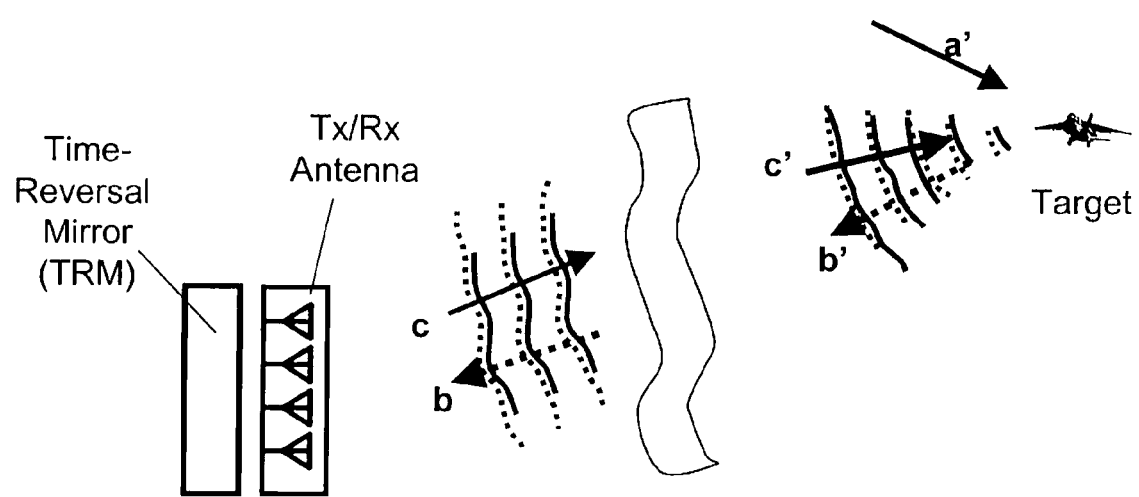
FIG. 1 is a schematic diagram of time-reversal imaging radar.
Figure 2:
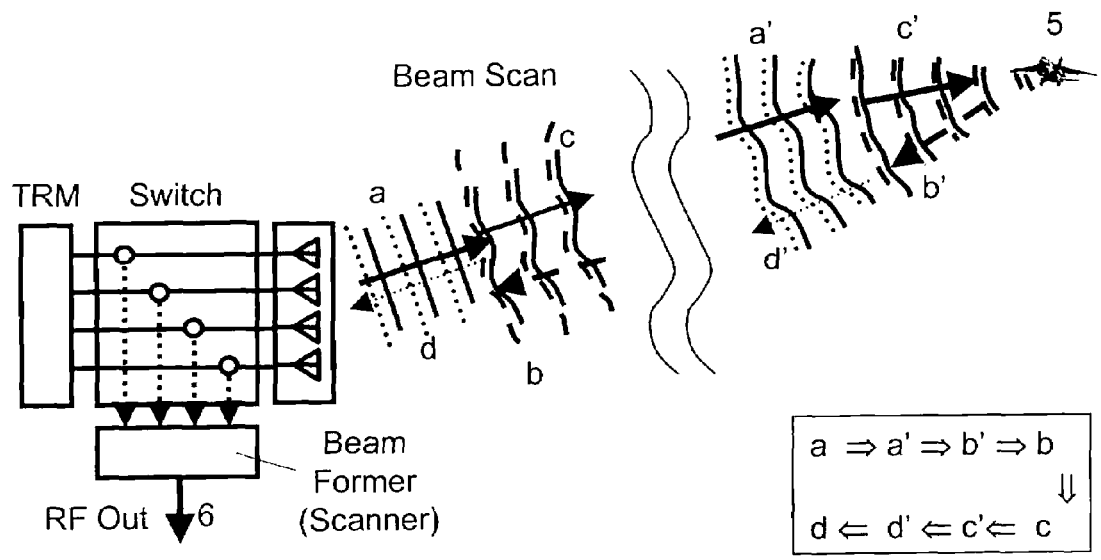
FIG. 2 is a schematic diagram of a time-reversal imaging radar process according to the invention.

Referring now to FIG. 2 and Table 2, the operational principle of the time-reversed double-passed extended virtual aperture (DPEVA) radar is described below in Table 2, noting that the "BEAM" is as shown in FIG. 2 with the corresponding number. To illustrate the concept described in Table 2, a basic radar system is illustrated in FIG. 2 that includes a TRM, a switch array, an antenna array, and a beam former.

TABLE 2

| BEAM | BEAM CHARACTERISTICS |
|---|---|
| a | Beam Former (Scanner) sends collimated beam at an angle θ |
| a' | Beam propagates through the atmosphere and its wavefront is distorted due to atmospheric turbulence, clutter and diffraction. |
| b' | Part of the beam is reflected from the target. Its wavefront is further distorted by the shape of the target. |
| b | Beam propagates through the atmosphere. Wavefront is even further distorted. |
| c | Part of beam b arriving at antenna array is time-reversed by TRM and is reflected back toward the target, with its wavefront partially resembling b. |
| c' | After transmission through the atmosphere, the beam resembles b' and so is focused on the target. |
| | *Coherent beam focusing on a target* |
| d' | c' (part of b'), after reflection from target, resembles part of b' (reversability of wave) |
| d | d' (part of a') converges to original a, resulting in beam focusing due to coherent summation at Tx/Rx |
| | *Coherent beam focusing at Rx* |
| | Vary the beam angle sequentially along the azimuth and elevation directions (as with conventional radar) and repeat the above procedures (a-d) to cover the entire field of regard (FOR) and to obtain high resolution imaging radar |

One of the most interesting features of the double-pass phase conjugation for radar imaging application is that the radar beam is focused at both target and receiver, satisfying imaging requirements regardless of atmospheric turbulence, as shown in FIG. 2 and Table 2.

In addition, the focused second-time conjugate wave illumination increases signal-to-noise ratio by two times in dB. For example, 10 dB SNR with a single-pass becomes 20 dB with double-pass due to squaring effect after double-pass.

By varying the beam angle sequentially along the azimuth and elevation directions using a photonic beam former as described below with reference to FIGS. 3-4, high resolution imaging can be achieved due to the tight beam focusing at both ends (see FIG. 2: target 5 and Tx/Rx after beam forming (6)), exactly the same way as an optical lens forms an image.

In this case, a returning beam after double-pass conjugation is along the same direction as the original steered transmitted beam regardless of distortion. As a result, after passing through the same beam former, the beam is coherently focused, making constructive interference at the receiver end.

Extended Virtual Aperture for High-Frequency Over-the-Horizon Radar (HF-OTHR)

To improve the resolution even further beyond the diffraction limit, the invention includes an extended virtual aperture mechanism. Traditionally, multipath interference has been one of the major hurdles in various communications. However, the multipath interference can be exploited to obtain super-resolution beam focusing in both space and time, e.g. as described in B. E. Henty and D. D. Stancil, "Multipath-Enabled Super-Resolution for rf and Microwave Communication using Phase-Conjugate Arrays," Phys. Rev. Lett. 93, 243904 (2004), and in M. Fink, "Time-Reversed Acoustics," Sci. Am. 281(5), 91 (1999). Such beam focusing is due to the randomly positioned EVA effect that stretches a signal beam both in space and time. In these publications, both groups experimentally demonstrated that in a multipath-rich environment, a beam can be focused to a spot that is more than an order of magnitude (15 times and 80 times along azimuth and range directions, respectively) smaller than would be possible in a line-of-sight configuration without multipath interference. Advantageously, OTHR operates in an environment where various multipath and bifurcation effects due to ionosphere, sea surface, and ground reflections, etc. are significant. Utilizing this phenomena, resolution can be drastically improved beyond the diffraction limit.

Implementations of Time-Reversed Double-Pass Extended Virtual Aperture (DP-EVA) Radar There are several methods for implementing phase conjugation, including a nonlinear-optical approach using $\chi^{(3)}$ or $\chi^{(2)}$-photorefractive effect, time-reversal, an electrical mixer to multiply signal with double-frequency local oscillation signal, and so on. The invention in different embodiments includes both time-reversal and frequency-domain mixer techniques, as follows.

Figure 3:
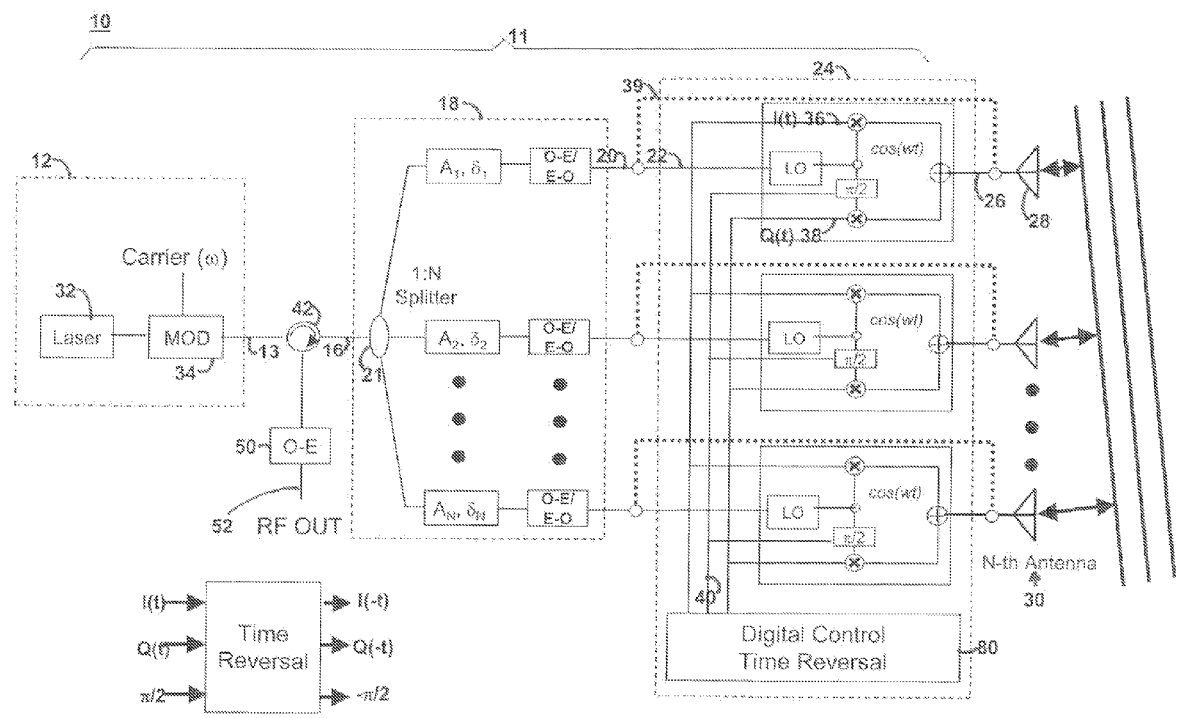
FIG. 3 is a schematic diagram of an embodiment of a time-reversal imaging radar system according to the invention.

Time-Reversal Embodiment:

Referring now to FIG. 3, in one embodiment the invention employs time-reversal. A radar system 10 includes a transmitter/receiver (transceiver) 11 having a plurality 1 to N (1:N) of input/output (I/O) channels 26 each coupled to an antenna 28 of an antenna array 30. Transceiver 11 includes a signal generator 12, for generating a RF carrier signal to an input 13 of an optical circulator 42 and then via circulator input/output 16 to a TTD (True time delay) fiber-optic beam former circuit 18. Beam former circuit 18 splits the input signal by an 1:N splitter 21 and introduces a time delay into each respective split signal to produce a plurality of time-delayed signals at outputs 20. Each I/O 20 is coupled to an input 22 of a time-reverser 24 time-reverser with each input/output (I/O) channel 26 coupled to a corresponding antenna 28.

Transceiver 11 transmits by antenna array 30 a first radar signal formed by the fiber-optic beam-former 18 directly through the path 39 (dotted line) without passing through the time-reverser 24. The returning signal reflected off a target is input to each I/O channel 26 of time-reverser 24. The signal is down-converted to slower baseband I(t) 36 and Q(t) 38 and is subsequently digitized and time-reversed by a computer 80. The time-reversed baseband signals I(−t), Q(−t) and the phase control signal π/2 40 generate a time-reversed version of the first-time reflected signal by the time-reverser 24.

The time-reversed signal is re-transmitted. This third beam experiences beam focusing at the target, and reflects from the target as a fourth beam. The fourth beam returning to the antenna 28 passes the path 39 that bypasses time-reversal 24. The signal is then passed through the same beam former 18, combined by the 1:N splitter/combiner 21, and is converted to an electrical signal by an optical electrical (O-E) converter 50 to form a sharply focused RF output 52. The double-pass, double beam-focused, beam-steered signal 52 is output to a monitor, e.g. an oscilloscope (not illustrated), for displaying the acquired radar image of the target.

The above procedures are repeated for all beam angles by varying the beam direction using the TTD Fiber-optic beam former.

In this embodiment in which phase conjugation is obtained using a time-reversal technique, signal generator 12 includes a laser source 32, e.g. a distributed feedback (DFB) laser, coupled to a modulator 34, e.g. an analog intensity modulator (lithium niobate or electro-absorptive), that encodes the baseband laser optical signal onto a carrier wave ω that is input into modulator 34. Output 16 from the circulator 42 is coupled to splitter/combiner 21 with a plurality of channels 16 that are the beam steerer 18 inputs. A reversed signal in the time-domain is equivalent to phase conjugation in the space domain. Time-reversal is useful for broadband beam operation since all the frequency components in a signal are simply stored and reversed and retransmitted. In order to process high speed signals, I-Q modulation is used to down-convert the rf signal, as is described in G. Lerosey, J. de Rosny, A. Tourin, A. Derode, G. Montaido, and M. Fink, "Time Reversal of Electromagnetic Waves," Phys. Rev. Lett. 92(19), 193904 (2004), incorporated herein by reference. In addition, a photonic beam former is used prior to the phase conjugator to achieve beam scanning needed for acquiring a radar image. A baseband signal includes a inphase (I) cosine component and a quadrature (Q) sine component. The desired time-reversal can be obtained by changing I(t), Q(t) and phase=$\pi/2$ to I(−t), Q(−t) and phase=−$\pi/2$, respectively, while maintaining precise timing relationship among elements, as is illustrated in the lower left box in FIG. 3. In the time-reversal implementation shown in FIG. 3, a hybrid approach was employed in the sense that signal is digitized and time-reversed at the baseband using I-Q modulation. Also, fiber-optics was used for both time-delay generation and precise high speed signal distribution.

Operational Procedure

Initially, equalize the pathlengths and attenuation between modulator 34 and the antennas 28 using the VOADGA beam former 18 as follows: Using a network analyzer, measure amplitude and phase (delay) between the modulator 34 and a probe located at each antenna 28. Adjust the amplitude and phase by using the VOADGA beam former 18, with either I or Q at a constant DC voltage level. This procedure is repeated for all the antenna elements 28 one by one, while maintaining the probe position precisely in the same plane. Also, the same procedure is repeated for all the beam steering angles to form a look-up-table (LUT) for future calibration. Furthermore, using the similar procedure, make sure that both I and Q signals are synchronized across all the elements. After the equalization is completed, the following procedure is repeated for all different steering angles to obtain an entire image:

1) Steer beam direction along (θ, φ) using the VOADGA based on the LUT.

2) Send a train of signal through the path 39 by bypassing the time-reverser 24.

3) Receive returning signal bounced back from a target. Down-convert the signal using the time-reverser 21 to generate baseband signals I(t) and Q(t). Digitize and store the signal 40 inside a computer 80 on a computer readable medium, e.g. in RAM, on a hard drive, or other computer readable media.

4) Calculate time-reversal of the baseband signals I(t) and Q(t) by reversing the signal in time. Also, set the phase angles of all the vector modulators to −$\pi/2$ in order to reverse carrier signal.

5) Send the time-reversed signal.

6) Switch the phase of vector modulator to normal mode by switching the phase angle from −$\pi/2$ to $\pi/2$.

7) Receive the double-pass returning signal through the bypassing path 39.

8) Pass the signal through the originally steered beam former to negate the original beam steering by canceling out the steering angle at each element.

9) The unsteered collimated beam is summed and is converted to an electrical signal by O-E converter 50 to form a focused RF beam 52 after coherent summation.

The acquired radar image may then be displayed on an oscilloscope or other type of monitor, and analyzed for target identification.

Frequency-Domain Phase-Conjugation Method

Figure 4:
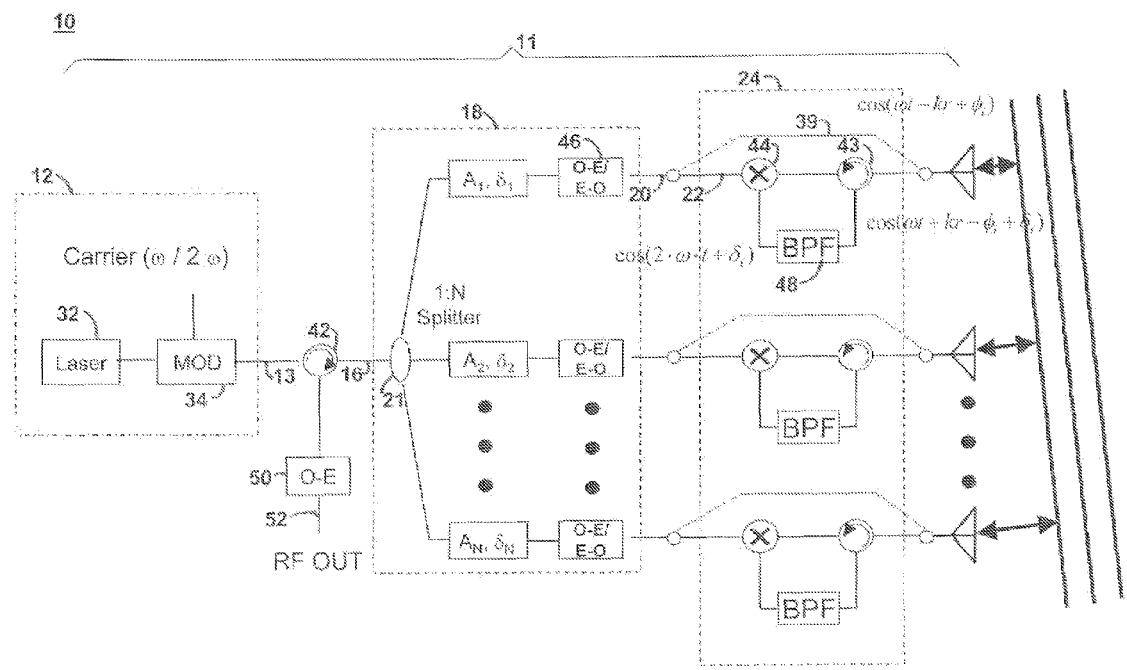
FIG. 4 is a schematic diagram of an embodiment of a time-reversal imaging radar system according to the invention.

FIG. 4 depicts another method to implement time-reversed DPEVA radar using mixers for narrow-band applications. In this case, beam is initially steered along some certain direction using the fiber-optic beam steerer 18. In this embodiment, phase conjugation is carried out in the frequency domain using electrical mixers 44. The laser input signal is modulated and split into N channels. The signal in each channel is then time-delayed by the fiber-optic beam steerer 18, converted to electrical signal by electrical-optical/optical-electrical (E-O/O-E) converter 46, and is directly connected to the corresponding Tx/Rx's antenna (as illustrated by the dotted line). The beam reflected off the target is passed through the antenna and is mixed with double frequency signal by the electrical mixer 44. The output from the mixer 44 is a phase-conjugate signal of the received signal after bandpass filtering by a band pass filter (BPF) 48.

The phase conjugate signal is retransmitted by the corresponding antenna through an electronic circulator 43, which routes signal along the counter-propagation direction. The second-time returning signal is converted to an optical signal by E-O/O-E converter 46 after bypassing the mixer (along the connection path indicated by the dotted line). The optical signal passes through the same fiber-optic beam former 18 and is summed after 1:N splitter and the circulator 42 and is converted to electrical signal by O-E converter 50. In this bi-directional architecture, the related components including VOADGA, O-E/E-O converters must be bi-directional. Also, in order to avoid unwanted coherent optical noise fluctuation after summing the optical signals, the coherence of E-O converter 46 should be reduced to a desired level.

Figure 5:
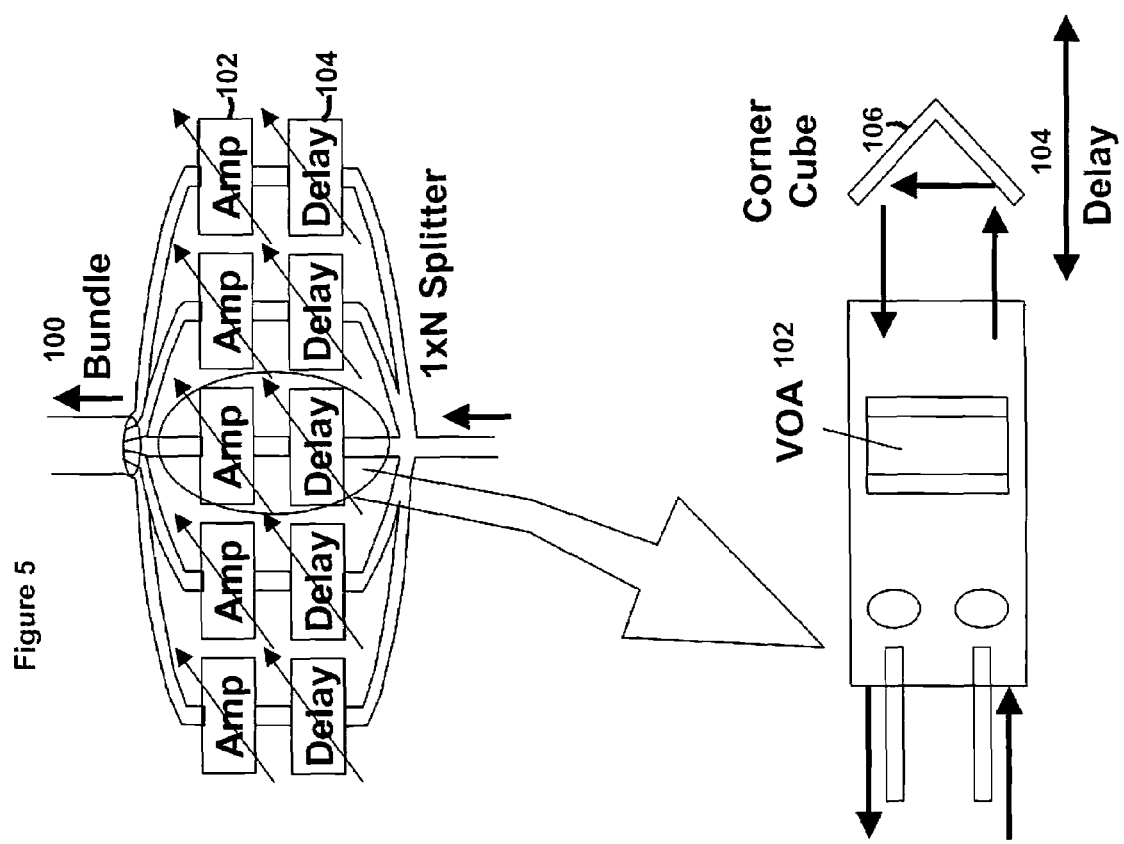
FIG. 5 is a schematic diagram of an embodiment of a variable optical attenuator and delay generator array according to the invention.
Figure 6:
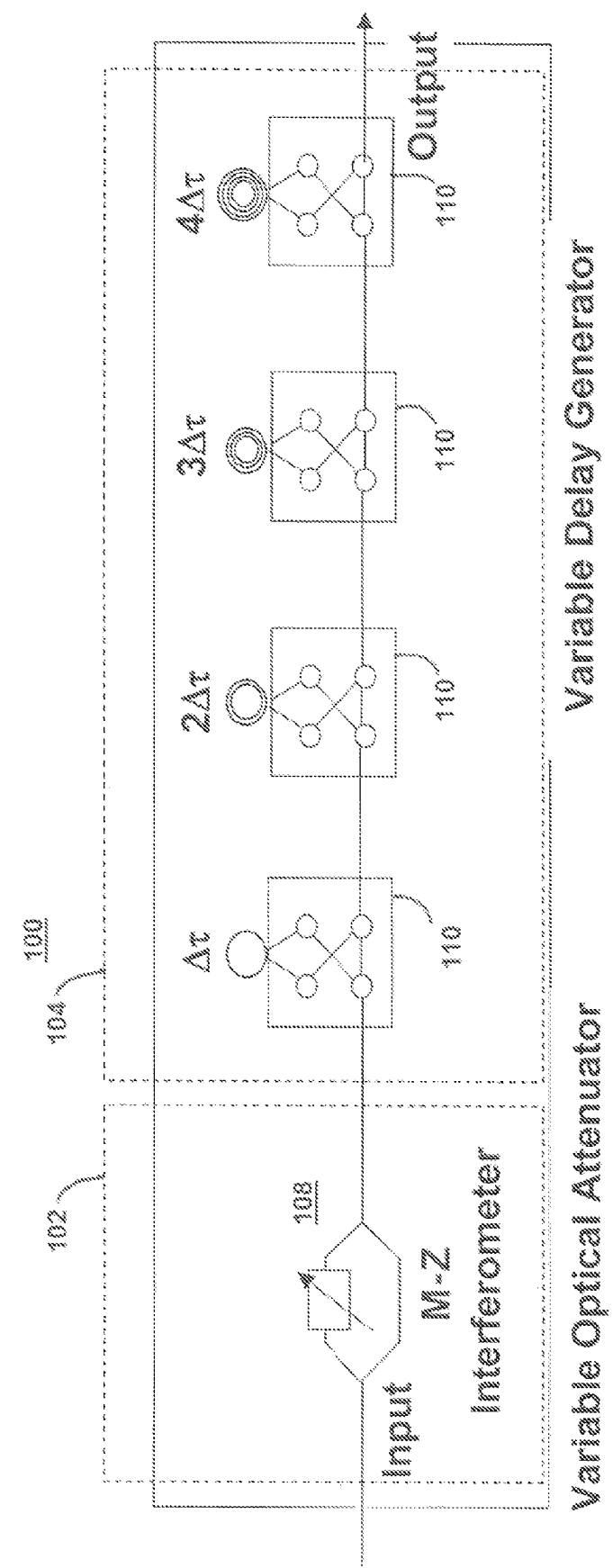
FIG. 6 is a schematic diagram of an embodiment of a variable optical attenuator and delay generator array according to the invention.

In both embodiments shown in FIGS. 3 and 4, beam steerer 18 preferably is a variable optical attenuator and delay generator (VOADGA) 100, shown in more detail in FIGS. 5 and 6. The VOADGA beam former 100 is an array of a combination of a variable optical attenuator (VOA) 102 and a variable delay generator (VDG) 104. The VOA 102 should be able to reduce light intensity with a large dynamic range (e.g., at about a 13 bit resolution) so that it can function as an on/off switch as well. The VDG 104 preferably generates time delays up to about 1ns (depending on N), with a resolution of about 0.5 ps. Although VOAs using various technologies such as liquid crystals, MEMS, PLC, etc, are readily available, and VDGs are commercially available as COTS components, the invention provides an integration of the two functions in a compact package. As such, VOADGAs 100 function as an optical equivalent of the delay and amplitude adjusting units in an RF front-end, and are amenable to other applications requiring the functionality including various coherent analog signal processing such as phased array antennas, coherent communications, RF link emulation, THz signal generation and femto-second pulse shaping, phase noise measurement, and optical signal processing.

VOADGA beamformer 100 can be implemented using bulk optics by inserting a corner cube 106 mounted on a translation stage inside a VOA 102, as shown in FIG. 5. Light from a fiber is collimated by a micro-collimating lens (e.g. GRIN lens) and is modulated by a VOA which is a spatial light modulator to vary the amplitude of output light. Various devices such as liquid crystals, MEMS (micro-electro-mechanical system), electro-optic crystals (PLZT, lithium niobate, etc.) or acoustic modulators can be used for this purpose. The modulated light is suitably delayed by translating a corner cube to generate desired time delay and is passed through the VOA again. Such double-pass though a VOA increases dynamic range significantly—twice in dB. The output light from the VOA is coupled to an output fiber through a micro-focusing lens. To permit compact packaging, micro-optic miniaturization of components and integration technique can be used. The entire package is hermetically sealed to provide environmental stability.

VOADGA beamformer 100 can be implemented using the PLC technology as shown in FIG. 6. VOADGA beamformer 100 for VOA 102 utilizes a Mach-Zehnder waveguide interferometer-type VOA 108 to provide variable attenuation of light (VOA) input from a laser input signal. The attenuated light is then delayed in DGA 104 utilizing digital waveguide crossbar switches 110 (illustrated for N=4 channels). VOA 102 and DGA 104 are integrated on a single substrate, as discussed above. PLC-based DGA's are commercially available from several vendors including Little Optics in MD. By incorporating the VOA part with the existing PLC-based DGA, VOADGA functionality can be achieved.

All-Digital Time-Reversal Method

Figure 7:
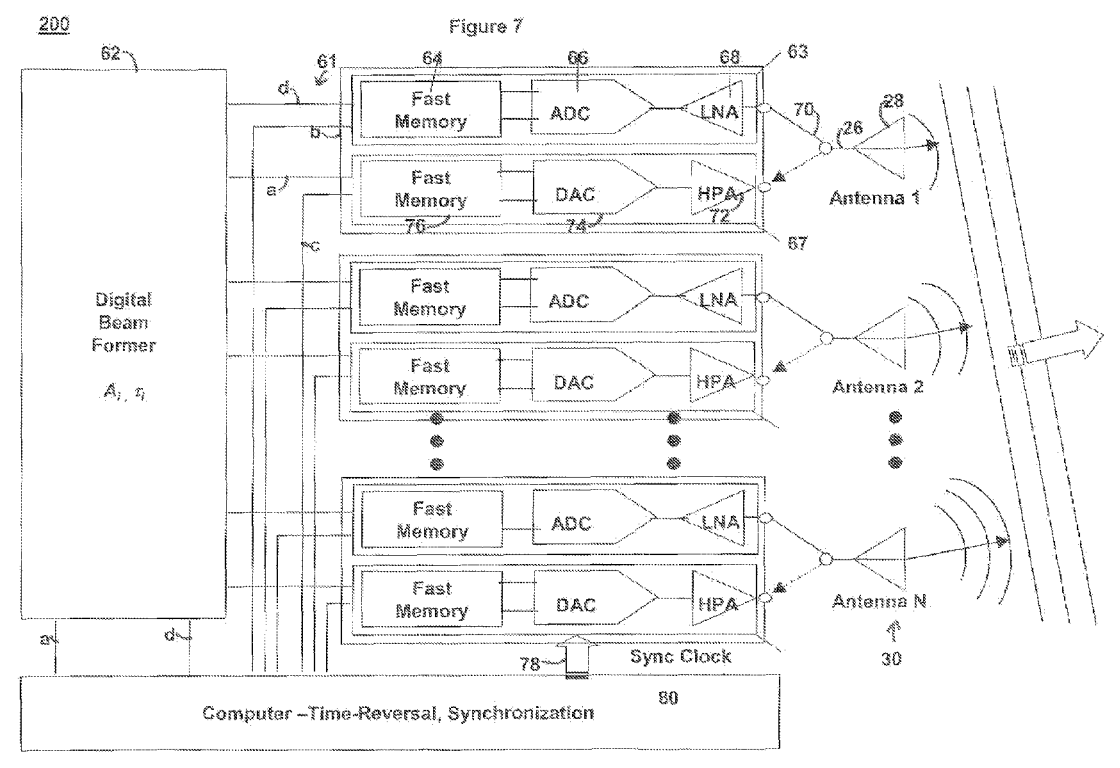

Another embodiment of implementing time-reversal in an all-digital manner is shown in FIG. 7. In the radar system 200 that includes a transceiver 61, the received signal is digitized at the element (carrier frequency) level and all the subsequent operations are achieved digitally, without requiring any hardware such as down-converting mixers or bandpass filters. In this case, sampling speed must be approximately ten times higher than carrier frequency (much faster than Nyquist sampling rate) to faithfully depict high speed signals in the time domain.

Transceiver 61 includes a digital beam former 62 that generates an array of N (number of antenna elements) digital RF carrier signals (shown as 'a' in FIG. 7), suitably delayed among elements to steer the beam along the desired direction. In a transmitter circuit 63, The digital signal is buffered in a fast memory 76, converted to an analog signal by a digital-to-analog converter (DAC) 74 at each element Triggered by a synchronization signal 78, the signal is transmitted by an antenna 28 after amplification by a high-power amplifier (HPA) 72 through a switch 70.

The first-time returning signals from a target pass through the antenna array 30 and an array of switches 70 that is now switched to a receiver circuit 67 that includes a low-noise amplifier (LNA) 68. The signal is then amplified and is digitized by an ADC 66 at the carrier (or element) level without down-conversion. The digital signal is stored in a fast memory 64 and is transferred to a computer 80 (shown as 'b').

The signal is then time-reversed by the computer 80 and is loaded in a fast memory 76 (along 'c'). The time-reversed signal is then converted to an analog signal by a DAC 74, is amplified by the HPA 72 and is retransmitted by an antenna 28.

Second-time returning signal is passed by the switch 70, which, this time, is set to LNA. The signal is amplified (68), digitized (66), and is captured (64). The signal is then passed through the digital beam former 62 (along 'd'), which was originally set to a particular direction. After passing through the beam former, the original steered beam angle is compensated and the resulting beam points along the broadside direction, which sums up coherently to form a sharp beam focusing by a computer 80.

All the timing control and synchronization can be achieved using time-stamping with a fast digital clock. Also, recent fast-growing DSPs (digital signal processors) and FPGAs (Field programmable gate arrays) would allow massively parallel interconnection and computing necessary in this architecture. Such FPGA and DSP-based beam forming can be achieved either in frequency domain using fast Fourier transform or in time-domain using tapped delay lines.

Such an all-digital approach has many advantages: Hardware becomes much simpler without requiring any mixers, band-pass filters, and fiber optics. Also, the system can be very flexible since all the configuration can be re-configured using software. Such a flexible reconfigurability allows for more advanced architectures such as ubiquitous radars, which will be described later.

Current ADC technologies are not sufficient to digitize high frequency microwave signals at the carrier level. However, this technology is developing very fast these days.

Ubiquitous Digital Time-Reversed Radar

A ubiquitous digital time-reversed radar can be implemented with the same system shown in FIG. 7. The only difference is that the digital beam former 62 must be multiplexed to handle multiple beams simultaneously.

Such a multiple beam former can be implemented by duplicating the single beam former to cover various angles concurrently. Each set of time-delays in the beam-former corresponds to a specific beam direction, as is the case with conventional phased array antenna. Therefore, for ubiquitous operation, multiple sets of time-delays are required, which often causes prohibitive hardware complexities when multiplicity is large.

Another way of implementing the multiple beam former is by Fourier transformation. In this case, each Fourier component corresponds to a specific beam angle.

One such embodiment shown in FIG. 8 (a) is a multiple digital beam former for reception, that is, a receiver. The incoming signal (90) from antenna elements I-N 28 is Fourier transformed by a Fast Fourier Transform (FFT) processor 92. The output (94) from the FFT processor is the Fourier transform where represents a beam steering angle. Each Fourier component represents a sum of all the incoming beams steered along direction. The field pattern is a scaled (demagnified) version of the far-field radiation pattern on the target plane.

Figure 8B:
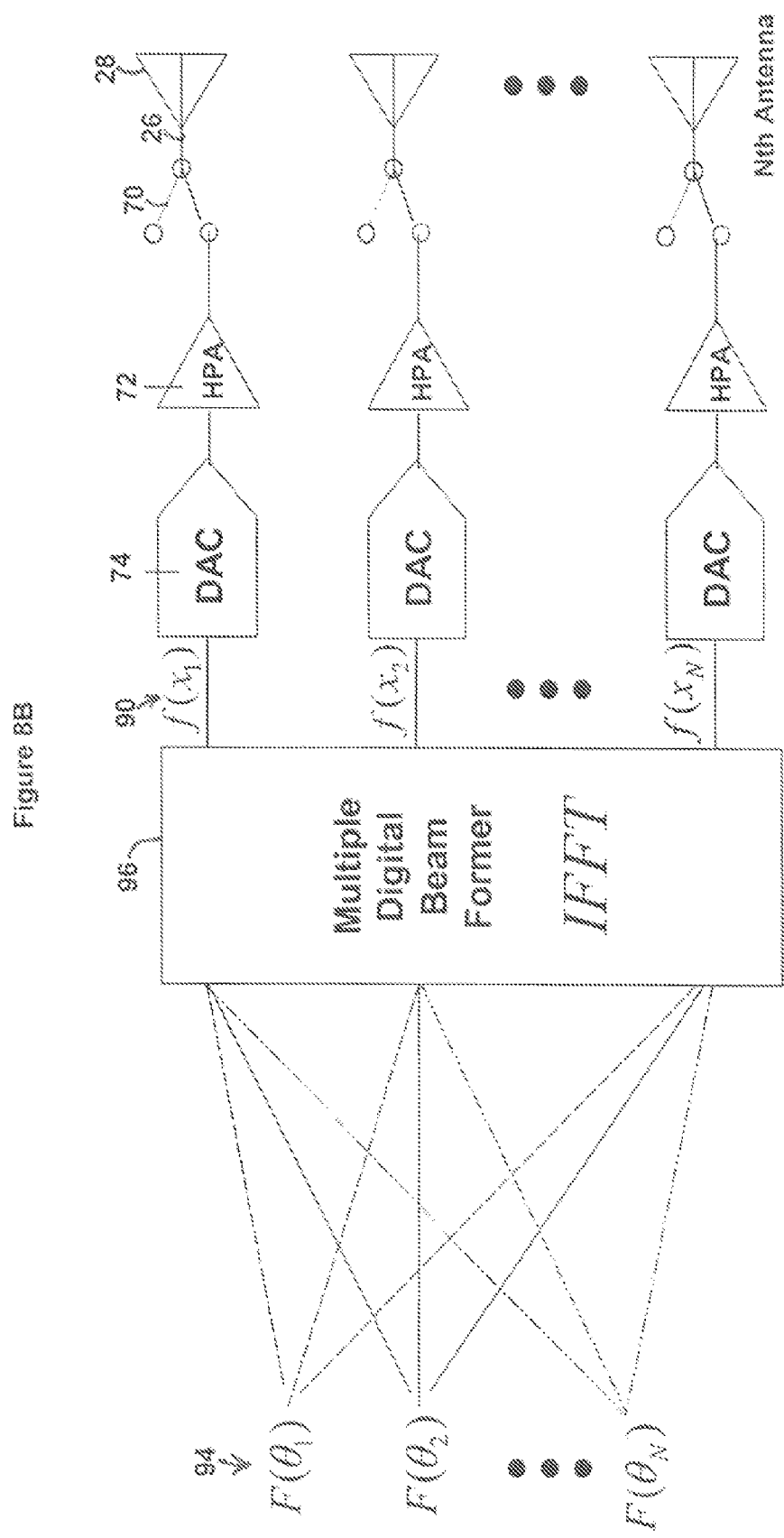
FIG. 8B is a schematic diagram of a multiple digital beam former transmitter according to the invention.

FIG. 8(b) shows a transmitter part of the multiple digital beam former. A set of 1-N inputs (94) is inverse Fourier transformed by the multiple digital beam former Inverse Fast Fourier Transform processor (IFFT) 96 to generate a set of output signals. Each output signal is converted to an analog signal 74 and is amplified before transmission by an antenna 28.

These FFT/IFFT can be implemented using modern DSP or FPGA as described previously. Also, both transmitter and receiver may be combined into a single system using bi-directional components.

In order to insert time-reversal functionality, the output from the ADC 66 can be tapped into a computer 80, as shown in FIG. 7. The time-reversed signal is then launched to the transmitter through DAC, HPA and switches.

III-3. Operational Modes

Systems 10 and 200 mainly operate in a pulsed mode whose pulsewidth is shorter than round-trip time of signal, as is common with conventional radars including synthetic aperture radars and HF-OTHRs (high-frequency over the horizon radars). However, it can also be operated in an iterative mode by resending the double-pass signal after switching the phase of the vector modulators between $-\pi/2$ (time-reversal) and $\pi/2$ (normal). In this way, iterative time-reversed signal can be focused to a target that has the strongest reflection. This feature is currently used for medical or mine detection applications.

The invention has been described with reference to certain preferred embodiments thereof. It will be understood, however, that modification and variations are possible within the scope of the appended claims.

What is claimed as new and desired to be protected by Letters Patent of the United States is:

1. A method of acquiring a high resolution radar image of a target beyond a diffraction limit in a multipath environment by coherently summing a scattered beam from multiple scatterers along a beam path in order to form a multipath-enabled extended virtual aperture, comprising:
   a) transmitting a first collimated coherent radar signal through a beamformer toward the target to reflect off the target as a first reflected radar signal then subject to distortion and multiple reflections by intermediate scattering sources;
   b) receiving the first reflected radar signal;
   c) processing the first reflected radar signal to generate a time-reversed synchronous and coherent radar signal;
   d) transmitting the time-reversed radar signal toward the target whereby coherent beam focusing with the first radar signal is realized at the target, with the time-reversed radar signal reflecting from the target as a second reflected radar signal time-reversed with the first radar signal;
   e) receiving the second reflected radar signal through the beamformer whereby coherent beam focusing with the first radar signal is automatically realized at the receiver thereby achieving a conjugate imaging between a common target and radar imaging plane;
   f) applying extended virtual aperture by coherently combining the beam scattered by multiple scattering sources to obtain a higher resolution beam focusing; and
   g) repeating steps a)-f) for a desired number of steering angles to thereby acquire a high resolution radar image.

2. A method as in claim 1, further comprising analyzing the acquired radar image to identify the target.

3. A method as in claim 1, wherein step (g) is performed by multiple digital beam forming.

4. A method as in claim 3, wherein the multiple digital beam forming is performed using fast fourier transform processing.

5. A method as in claim 1, wherein time-reversal is realized in the frequency domain.

6. A time-reversal radar imaging system for acquiring an image of a remote target, comprising:
   an antenna array including a plurality of spaced-apart antennas and a beamformer;
   a transceiver coupled to the antenna array for alternately transmitting a collimated coherent radar signal via the antenna array through the beamformer toward the target and for receiving target-reflected radar signals; and
   wherein said transceiver includes means for multiple-pass time-reversing the transmitted and received radar signals and for applying extended virtual aperture by coherently combining the beam scattered by multiple scattering sources to obtain a higher resolution beam focusing whereby coherent beam focusing is realized at both the target and at the receiver to thereby enhance the resolution of the acquired target image.

7. A radar imaging system as in claim 6, wherein the means for multiple-pass time-reversal radar signals comprises:
   a fiber-optic signal generator and signal carrier for generating and outputting the radar signals at a carrier output;
   a fiber-optic beam steerer having an input coupled to the carrier output and a plurality of beam-steered signal outputs; and
   an electrical time-reverser having a plurality of inputs each coupled to a corresponding beam-steered signal output and having a plurality of corresponding outputs each coupled to an antenna input for generating and receiving multiple-time-reversal radar signals whereby the enhanced-resolution radar image is acquired.

8. A radar imaging system as in claim 7, wherein the fiber-optic signal generator and signal carrier comprises:
   a laser signal source with an output;
   a fiber-optic carrier having an input coupled to the laser signal source output and an output; and
   a fiber-optic splitter having an input coupled to the fiber-optic carrier output and having a plurality of outputs; and
   wherein the fiber-optic beam steerer comprises a variable optic attenuator and delay generator having a plurality of inputs each coupled to a corresponding splitter output and a plurality of outputs comprising the beam-steered signal outputs.

9. A radar imaging system as in claim 8, wherein the electrical time-reversal comprises:
   a bi-directional vector modulator coupled between each of said fiber-optic beam steerer outputs and a corresponding antenna input; and
   a bi-directional analog-to-digital converter and storage buffer coupled to each vector modulator.

10. A radar imaging system as in claim 8, further comprising
   a first electrical mixer coupled between the fiber-optic carrier generator output and the fiber-optic beam steerer input; and
   a second electrical mixer coupled between each of said beam-steerer outputs and a corresponding phase conjugator input.

11. A time-reversal radar imaging system for acquiring an image of a remote target, comprising:
   an antenna array including a plurality of spaced-apart antennas;
   a switch;
   a computer programmed to time reverse a first return radar signal prior to retransmitting a time-reversed radar signal toward a target, said computer including a digital clock for signal timing control and synchronization;
   a transceiver coupled to the antenna array through the switch for alternately transmitting a radar signal via a transmitter circuit to the antenna array toward the target and for receiving a reflected radar return signal via a receiver circuit from the antenna array, wherein:

the transmitter circuit includes a digital beam former;

the receiver circuit includes: a low noise amplifier coupled to the switch;

an analog-digital converter (ADC) coupled to the low noise amplifier;

a first fast memory having an input coupled to the ADC, an output coupled to the digital beam former; and an input/output coupled to the computer; and the transmitter circuit includes:

a high power amplifier (HPA) coupled to the switch;

a digital-to-analog converter (DAC) coupled to the HPA; and a second fast memory having a first input coupled to the digital beam former, a second input coupled to the computer, and an output coupled to the DAC; and wherein the digital beamformer includes means for applying extended virtual aperture by coherently combining the beam scattered by multiple scattering sources to obtain a higher resolution beam focusing whereby coherent beam focusing is realized at both the target and at the receiver to thereby enhance the resolution of the acquired target image.

12. A radar imaging system as in claim 11, further including a multiple digital beam former.

13. A radar imaging system as in claim 12, wherein the multiple digital beam former includes a fast fourier transform processor.

* * * * *